Sept. 3, 1940.  P. P. B. STRAUSS  2,213,749
PHOTOGRAPHIC APPARATUS
Filed Oct. 5, 1938
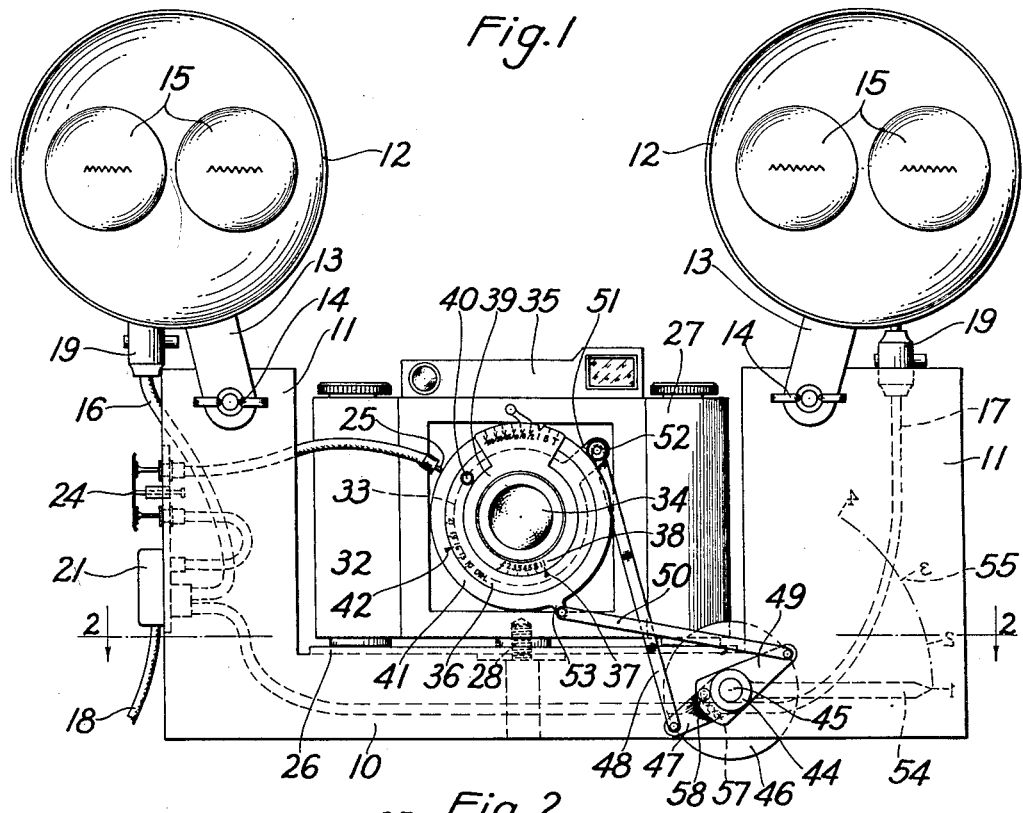
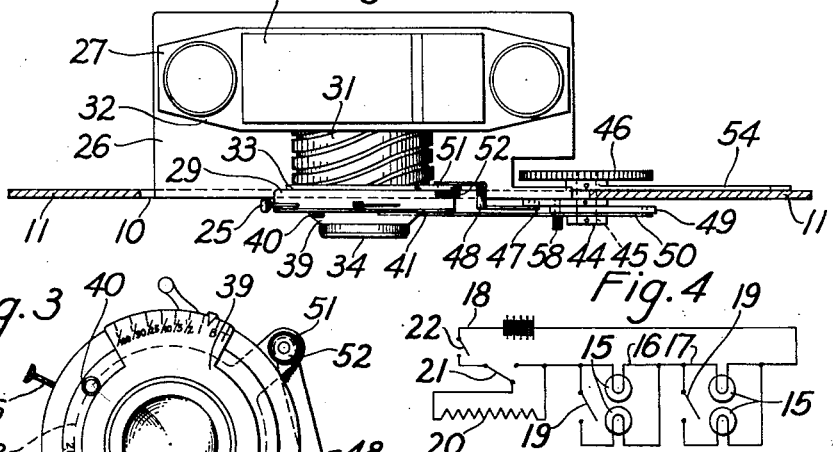
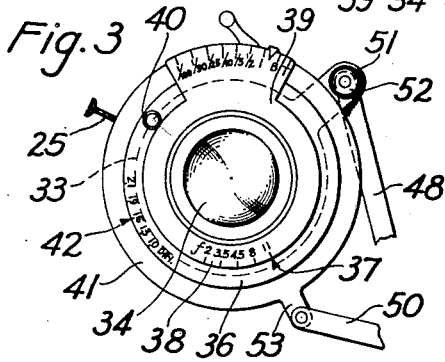
Philipp P. B. Strauss
INVENTOR
BY
ATTORNEYS Patented Sept. 3, 1940

2,213,749

UNITED STATES PATENT OFFICE 2,213,749

PHOTOGRAPHIC APPARATUS

Philipp Paul Bernhard Strauss, Berlin-Johannisthal, Germany, assignor to Eastman Kodak Company, Rochester, N. Y., a corporation of New Jersey Application October 5, 1938, Serial No. 233,430
In Germany February 5, 1938

15 Claims. (Cl. 95—10)

The present invention relates to a photographic apparatus, including a camera and a support therefor, and particularly to such an apparatus wherein the light controlling means of the camera is inter-connected with the focusing adjustment thereof so that it is properly set in accordance with the distance from the camera of the subject to be photographed, said connection between the light controlling means and the focusing adjustment being mounted on the support for the camera.

For newspaper photography, there have already been proposed arrangements in which a camera is rigidly connected with reflector carriers that is to say, with light sources for photographing, so that the camera and light sources are always at concordant distances from the subjects being photographed. However, the luminosity of the light source must be varied in accordance with the particular distance of the camera from the subject, or the camera objective must be suitably screened off for the purpose of obtaining a constant exposure of the film.

The alteration of the luminosity of the light source may be obtained, for example, by changing the incandescent bulb, or photoflash bulb, from one size to another. This method is mostly employed in the instances where photoflash bulbs are used for these are spent after each exposure and are obtainable in different sizes. However, this method is not desirable where incandescent lamps are used because, in contra-distinction to photoflash bulbs, these do not have to be replaced after each exposure. Consequently, where incandescent lamps are used, a regulating resistance must be provided by means of which a dimming of the lamps will be effected when the camera approaches the subject being photographed.

Therefore, one object of the present invention is to provide a photographic apparatus including a focusing camera having an adjustable diaphragm, said apparatus including means whereby the diaphragm opening is automatically adjusted in accordance with the distance of the camera from the subject being photographed. Another object is to provide an apparatus of the type described which includes a support to which the camera is attached, and in which the means for automatically adjusting the diaphragm in accordance with the range of the camera takes the form of a linkage movably mounted on the support. And yet another object is to provide an apparatus of the type described wherewith the camera can be focused and the diaphragm adjusted by an operating member on the support acting through said linkage. A further object is to provide an apparatus of the type described wherein an illuminating means is carried by the support. And another object is to provide an apparatus of the type described where the above-mentioned linkage can be altered to effect the proper adjustment of the diaphragm in accordance with a variation in the luminosity of the illuminating means as well as the range of the camera. And another object is to provide an apparatus of the type described where the connection between the focusing adjustment and diaphragm adjustment of the camera can be altered in dependence upon the speed of the film being used.

The novel features that I consider characteristic of my invention are set forth with particularity in the appended claims. The invention itself, however, both as to its organization and its method of operation, together with additional objects and advantages thereof will best be understood from the following description of a specific embodiment when read in connection with the accompanying drawing in which, Fig. 1 is a front elevation showing the hereinafter described photographic apparatus constructed in accordance with the preferred form of the invention, Fig. 2 is a section taken substantially on line 2—2 of Fig. 1, Fig. 3 is a front view of the camera objective alone and enlarged to show the relative positions of the focusing ring, diaphragm adjusting ring, and the connection between the two permitting adjustment in dependence upon the film speed and, Fig. 4 is a wiring diagram for the apparatus.

Like reference characters refer to corresponding parts throughout the drawing.

This arrangement is especially advantageous in combination with cameras of the range finder type or ground glass focusing type because, in these instances, there is given the greatest assurance that the focusing adjustment agrees with the actual distance of the subject being photographed. However, cameras having no means of visual focusing could be used with accuracy if the distance between the camera and the subject is known, or determined, so that the focusing adjustment could be accurately set in accordance therewith.

Referring now to the drawing wherein a preferred embodiment of the invention is shown, 10 indicates a portable support including vertically extending portions 11 at either end thereof to which reflectors 12 on brackets 13 are pivotally attached to be clamped in position by wing nuts 14. Each reflector is provided with two sockets, not shown, in which incandescent lamps 15 are situated, the two sockets of each reflector being connected in parallel relative to one another, while one lamp of each reflector is connected in series by cables 16 and 17 into the main line 18 connected to a battery, or other source of electricity, see Fig. 4. One lamp in each reflector can be cut out of the circuit by snapping the switch 19 connected as shown in the wiring diagram, and this provides means whereby the operator can change the luminosity of the illuminating means by cutting two, three, or four lamps into the circuit, as he may desire. Preferably, these lamps are connected to a series resistance 20 in the line 18 which can be short-circuited by the switch 21 so that the lamps are connected at full luminosity at the instant of exposure, line 18 being controlled by the main switch 22. Switch 21 is preferably normally held in the position shown where the series resistance is cut into the circuit so that when the main switch 22 is closed, the lamps will be turned on dim for composing and focusing purposes. The switch 21 may be actuated by a synchronizer 24 of any well-known type connected between the same and shutter release 25 on the camera, so that the instant the shutter is tripped the series resistance will be short-circuited insuring full luminosity of the lamps at the instant of exposure.

The portable frame 10 includes a horizontal platform 26 on which the camera, indicated generally as 27, is adapted to be attached by a suitable attaching screw 28 adapted to engage the tripod attaching socket provided on all well-known cameras. Although for the purpose of illustration I show and describe a specific type of camera in conjunction with the support, it will be readily understood that any type of focusing camera having an adjustable diaphragm could be used. The camera shown is of the collapsible type wherein the shutter and lens unit 29 is mounted on the end of a spirally threaded tube 31 which screws into and out of the body 32 for collapsing the camera or extending the same to its picture taking position. This tube 31 has but two positions, one fully extended for picture taking, and one fully retracted for closing of the camera, and it is to be understood that its adjustment has no connection whatever with the focusing of the camera.

The camera is adapted to be focused in a well known manner through rotation of the focusing ring 33 which is suitably connected to the mounting of the lens elements going to make up the camera objective 34 so as to effect a relative longitudinal adjustment of the same as is well known in the art. The range finder 35 of the camera may be connected to the focusing ring 33 in any well-known manner, so that visual indication will be given the operator when the camera is properly focused. The lens and shutter unit includes a well-known type of adjustable diaphragm of the iris type which is connected to and adjusted by the rotatable diaphragm adjusting ring 36 as is well known in the art. The adjustable diaphragm of this camera may be of the type shown in U. S. Patent 1,689,268, Otto Wittel, issued October 30, 1928. The diaphragm adjusting ring 36 bears an index 37 for cooperating with the diaphragm scale 38 etched on the stationary lens plate 39, and can be rotated by gripping the button 40 attached thereto.

As is characteristic of a well-known shutter unit, provision is made for an adjustment of the diaphragm to take into account film speeds. For this purpose the diaphragm adjusting ring 36 instead of being directly engaged for rotation, is in frictional engagement with an operating ring 41 which is rotatably mounted on the shutter unit, and relative to which the diaphragm adjusting ring 36 can be rotated by button 40 if the operating ring is held stationary. The operating ring 41 bears an index 42 which cooperates with a film speed scale etched on the diaphragm adjusting ring. If the operating ring 41 is held stationary and the diaphragm adjusting ring 36 is rotated by button 40 until the speed indication thereon and corresponding to the film being used is aligned with the index 42, an adjustment of the diaphragm corresponding to the film speed is effected, which diaphragm adjustment is independent of and in addition to the adjustment of the diaphragm in accordance with the distance of the subject from the camera and affected by a rotation of the operating ring 41 as will be hereinafter described.

When the camera is placed on the platform 26 in its open picture-taking position, the lens and shutter unit 29 thereof extends substantially into the plane of the vertical portions 11 of the support 10. The focusing ring 33 and the diaphragm adjusting ring 36 are inter-connected so that the diaphragm can be adjusted automatically, simultaneously, and in proper relation with the adjustment of the former. To this end a double armed lever 44 is fixed to the shaft 45, rotatably mounted on the support 10, which shaft can be rotated by hand knob 46 fixed thereto and extending to the rear of the support. Pivoted to the arm 47 of the double arm lever 44 is a link 48, while the other arm 49 of lever 44 is pivoted link 50. When the camera is placed on the support 10, the free end of link 48 is adapted to be connected to the focusing ring 33 by being pivotally attached by any suitable attaching means to a lug 51 integral with said ring, said lug 51 including a knurled roller 52 which normally serves as a grip when focusing the camera. The free end of link 50 is adapted to be pivotally attached to a lug 53 extending radially from the operating ring 41.

Upon rotation of the double arm lever 44, the focusing ring 33 and the diaphragm adjusting ring 36 are rotated at the same time. The linkage and transmission thereof is such that the diaphragm aperture is altered in relation to the square of the range. Thus, if the diaphragm has been adjusted to a definite value, e. g., f.11, and for a range of one meter, and this range is altered to two meters, the diaphragm is opened to double the diaphragm, or f.5.6. This follows the reasoning that when the lamps are moved to and from a subject along with the camera, the farther the camera from the subject, the more light that is needed to make a given exposure, hence the larger diaphragm opening. The change in focus is preferably affected not at the roller 52 in the camera, but by the hand knob 46 on the support 10. A pointer 54 fixed to the shaft 45 cooperates with a range scale 55 at the rear of the support, calibrated in units of distance to correspond with the focusing adjustment of the objective 34, so that the distance for which the objective is adjusted at any time can be read off of the scale 55.

A variation in the luminosity, effected by increasing or decreasing the number of lamps in the circuit, will necessarily affect the relationship between the diaphragm opening and the range for any given exposure, and must be accounted for by altering the linkage between the focusing ring 33 and the diaphragm adjusting ring 36. To this end I preferably construct the double arm lever 44 so that the arcuate relationship of the two arms thereof can be varied.

I accomplish this by making arms 47 and 49 of the lever 44 separate, and mounting them separately on a shaft 45. Arm 47 is fixed to shaft 45 to rotate therewith, while arm 49 is rotatably mounted on the shaft in abutment with arm 47. The arm 47 is provided with a plurality of arcuately spaced holes 57 in any one of which a retractable spring pressed pin 58 carried by the arm 49 is adapted to snap to rigidly connect the two arms in a given arcuate relationship so that they serve as a double ended lever to be rotated by knob 46. It will be readily understood by those skilled in the art that a change in the arcuate relationship of arms 47 and 49 will alter the relationship of the diaphragm adjustment and any one focusing adjustment, but the diaphragm will still be adjusted in relation to the square of the range. For instance, if when the arms 47 and 49 are rigidly connected at 180 degrees relative to one another as shown, giving a range adjustment of one meter corresponding to a diaphragm adjustment of f.11, is satisfactory for a luminosity of four lamps, a relative arcuate adjustment of the arms 47 and 49 suitable for three lamps might give a reading of f.5.6 at a range of one meter. This would be true since an adjustment of the arm 49 relative to the arm 47 would change only the diaphragm opening, not the range adjustment, and would follow because, with a reduction in luminosity, a greater diaphragm opening would be required for keeping the exposure constant in the two instances. The holes 57 are so spaced relative to one another in the arm 49 that the relative positions of the arms 47 and 49 determined thereby will correctly alter the relationship between the focusing ring 33 and diaphragm adjusting ring 36 in accordance with the number of lamps in the circuit or in other words, the total luminosity of the illuminating means. For instance, if the relative positions of the arms 47 and 49 as shown is satisfactory for the luminosity of four lamps, the succeeding hole might be so located as to set the arms for a luminosity of three lamps, etc. It is pointed out that instead of using a plurality of lamps for altering the luminosity, a single lamp having a variable wattage might be used, e. g., 100, 150, and 300 watts, in which case the holes 57 would be spaced to alter the linkage in accordance with the wattage at which the single lamp was set.

While I have described the apparatus as including means for altering the connection between the focusing ring 33 and the diaphragm adjusting ring 36 in accordance with both the luminosity of the illuminating means and the sensitivity or speed of the film, it is to be understood that the apparatus could be adapted for alteration in accordance with the change in luminosity alone, or in accordance with the change in film speed alone. By way of example, if the apparatus was to be altered in accordance with a change in luminosity alone, the operating ring 41 could be eliminated by connecting the link 50 directly to the diaphragm adjusting ring 36 and providing only for a relative adjustment of the arms 47 and 49 on the double armed lever 44. If the apparatus were to be adapted for alteration in accordance with different film speeds alone, the operating ring 41 could be provided as shown and described, but the double arm lever 44 would not have to be constructed so as to provide for relative adjustment of the arms 47 and 49 thereof.

Inasmuch as the support 10 itself includes the linkage for properly connecting the focusing ring of a camera with the diaphragm adjusting member thereof, which linkage is easily connected and disconnected from the camera positioned thereon, any type of camera could be used in combination with the support so long as it was of the focusing type, in which focusing was accomplished by rotation of an adjusting member, and included an adjustable diaphragm. In order that the connection between the focusing adjustment and the diaphragm adjustment of the camera could be altered to account for different film speeds, it will be understood that the camera must be one of a well-known type which is itself adapted for such an adjustment, as is the camera herein shown and described in connection with the apparatus.

In use, the camera in its picture taking position is attached to the horizontal platform 26 of the support 10, and the links 48 and 50 on the support are connected to the focusing link 33 and the diaphragm adjusting ring 36, respectively, as shown. In the present instance, the camera being provided with an adjustment in accordance with the film speed, which includes a rotatable operating ring 41 frictionally connected to but capable of rotation relative to the diaphragm adjusting ring 36, the link 49 is connected to said operating ring 41 instead of directly to the diaphragm adjusting ring 36. Now, if a film having a known speed of 16 DIN is to be used, the operating ring 41 is held stationary and the diaphragm adjusting ring 36 is rotated by gripping button 40 until 16 DIN on the film scale thereon is aligned with the index 42 and the operating ring 41. This adjustment effects a change in the diaphragm opening independent of the focusing adjustment. Now if a luminosity of four lamps is used, the pin 58 on the arm 49 is retracted and arm 49 is rotated relative to the arm 47 until said pin drops into one of the holes 57 in arm 47 giving the arcuate relationship of the arms 47 and 49 corresponding to the luminosity of the illuminating means. Now the apparatus is ready for use, and sighting the subject through the range finder 35, the camera is focused by rotating the hand knob 46 which rotates the double armed lever 44 to effect the focusing and a simultaneous and automatic adjustment of the diaphragm of the camera, in proper relation to the range, or distance of the subject, said focusing and diaphragm adjustment being properly effected by the linkage on the support, including double armed lever 44 and links 48 and 50. After the camera is in focus, the exposure is made by actuating the synchronizer 24 which instantaneously releases the shutter and short circuits the series resistance 20 in the lamp circuit so that the lamps are turned on at full luminosity for the exposure, from a reduced luminosity used for focusing and composing purposes. The range of the subject will be indicated on the scale 55 on the rear of the support 10 by the pointer 54 so that it can be observed by the operator while behind the apparatus in picture taking position, and if a camera without a range finder is used and the distance to the subject is known, the camera can be focused by properly setting pointer 54 on the scale 55.

Although I have shown and described one embodiment of my invention, I am fully aware that many modifications thereof are possible. My invention, therefore, is not to be restricted except insofar as is necessitated by the prior art and by the spirit of the appended claims.

Having thus described my invention, what I declare is new and desire to secure by Letters Patent of the United States is:

1. In a photographic apparatus of the type described, the combination of a portable support, illuminating means on said support, means for attaching a focusing camera having an adjustable diaphragm to said support substantially in the plane of said illuminating means, said camera including means for focusing the same, and means for adjusting the diaphragm thereof, means for inter-connecting said focusing means and said diaphragm adjusting means whereby the latter is adapted to be adjusted simultaneously by an adjustment of the former whereby the size of the diaphragm aperture varies directly as the change in distance of the object and in accordance with the luminosity of said illuminating means, said means including a part movably mounted on the support.

2. In a photographic apparatus of the type described, the combination of a portable support, illuminating means on said support, means for attaching a focusing camera having an adjustable diaphragm to said support substantially in the plane of said illuminating means, said camera including means for focusing the same, and means for adjusting the diaphragm thereof, a linkage for inter-connecting said focusing means and said diaphragm adjusting means whereby the latter is adjusted simultaneously by an adjustment of the former whereby the size of the diaphragm aperture varies directly as the change in distance of the object and in accordance with the luminosity of said illuminating means, one member of said linkage movably mounted on the support.

3. In a photographic apparatus of the type described, the combination of a portable support, an illuminating means carried by said support, and including means for varying the luminosity of the same, means for attaching a focusing camera having an adjustable diaphragm to said support substantially in the plane of said illuminating means, said camera including means for focusing the same, and means for adjusting the diaphragm thereof, means on said support for inter-connecting said focusing means and said diaphragm adjusting means, whereby the latter is adapted to be adjusted simultaneously by an adjustment of the former whereby the size of the diaphragm aperture varies directly as the change in distance of the object and in accordance with the luminosity of said illuminating means, and means for altering said inter-connecting means and in accordance with a change in the luminosity of said illuminating means whereby the diaphragm is adapted to be adjusted properly upon focusing of the camera to give a correct exposure in accordance with the luminosity of the illuminating means and the distance of the subject from said illuminating means.

4. In a photographic apparatus of the type described, the combination of a portable support, an illuminating means carried by said support, and including means for varying the luminosity of the same, means for attaching a focusing camera having an adjustable diaphragm to said support substantially in the plane of said illuminating means, said camera including means for focusing the same, and means for adjusting the diaphragm thereof, a linkage for inter-connecting said focusing means and said diaphragm adjusting means, whereby the latter is adapted to be adjusted simultaneously by an adjustment of the former whereby the size of the diaphragm aperture varies directly as the change in distance of the object and in accordance with the luminosity of said illuminating means, one member of said linkage movably mounted on said support, and means for altering said linkage in accordance with a change in the luminosity of said illuminating means.

5. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including means for focusing the same, and means for adjusting the diaphragm thereof, a linkage for inter-connecting said focusing means and said diaphragm adjusting means, whereby the latter is adapted to be adjusted simultaneously by an adjustment of the former whereby the size of the diaphragm aperture varies directly as the change in distance of the object and in accordance with the luminosity of said illuminating means, one member of said linkage movably mounted on said support, means for altering said linkage, in accordance with a variation in the luminosity of said illuminating means, and an operating member movably mounted on said support and connected to said linkage, whereby movement thereof is adapted to effect the desired and simultaneous adjustment of said focusing and diaphragm adjusting means.

6. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including a rotatable focusing ring, and a rotatable diaphragm adjusting ring, a linkage on said support arranged to inter-connect said focusing ring and said diaphragm ring, whereby the diaphragm ring is adapted to be adjusted simultaneously by an adjustment of the focusing ring whereby the size of the diaphragm aperture varies directly as the change in distance of the object and in accordance with the luminosity of said illuminating means, said linkage comprising a double-ended lever rotatably mounted on the support, a link connecting one end of said lever with the focusing ring, and a second link connecting the other end of said double ended lever with the diaphragm ring.

7. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including a rotatable focusing ring, and a rotatable diaphragm adjusting ring, a linkage on said support arranged to inter-connect said focusing ring and said diaphragm ring, whereby the diaphragm ring is adapted to be adjusted simultaneously by an adjustment of the focusing ring whereby the size of the diaphragm aperture varies directly as the change in distance of the object and in accordance with the luminosity of said illuminating means, said linkage comprising a double-ended lever rotatably mounted on the support, a link connecting one end of said lever with the focusing ring, and a second link connecting the other end of said double-ended lever with the diaphragm ring, and a rotatable pointer connected to said double-ended lever and moving over a focusing scale on the support, whereby the focusing of the camera is indicated by the positions of and can be accomplished through a movement of said pointer.

8. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including a rotatable focusing ring, and a rotatable diaphragm adjusting ring, a linkage on said support arranged to inter-connect said focusing ring and said diaphragm ring, whereby the diaphragm ring is adapted to be adjusted simultaneously by an adjustment of the focusing ring whereby the size of the diaphragm aperture varies directly as the change in distance of the object and in accordance with the luminosity of said illuminating means, said linkage comprising a double-ended lever rotatably mounted on the support, a link connecting one end of said lever with the focusing ring, and a second link connecting the other end of said double-ended lever with the diaphragm ring, and means for altering the relative positions of the two ends of said double-ended lever, whereby the adjustment of the diaphragm ring relative to the adjustment of the focusing ring can be varied in accordance with a variation in the luminosity of said illuminating means.

9. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including a rotatable focusing ring, and a rotatable diaphragm adjusting ring, a linkage on said support arranged to inter-connect said focusing ring and said diaphragm ring, whereby the diaphragm ring is adapted to be adjusted simultaneously by an adjustment of the focusing ring whereby the size of the diaphragm aperture varies directly as the change in distance of the object and in accordance with the luminosity of said illuminating means, said linkage comprising a double-ended lever rotatably mounted on the support, a link connecting one end of said lever with the focusing ring, and a second link connecting the other end of said double-ended lever with the diaphragm ring, said double-ended lever comprising an arm pivotally mounted on the support, and provided with a plurality of spaced apertures, a second arm pivotally mounted on the support adjacent said first arm, and a retractable pin carried by said second arm and adapted to engage one of the apertures in said first arm to rigidly connect the two arms together, the relative positions of the two arms being determined by which of said apertures said retractable pin engages, whereby the adjustment of the diaphragm ring relative to the adjustment of the focusing ring can be varied in accordance with a variation in the luminosity of said illuminating means.

10. In a photographic camera of the type described, the combination of a portable support, an illuminating means on said support, means for attaching a focusing camera including an adjustable diaphragm to said support substantially in the plane of said illuminating means, said camera including a focusing member, and a diaphragm adjusting ring, means for inter-connecting said focusing member and said diaphragm adjusting ring, whereby the latter is adapted to be adjusted simultaneously by an adjustment of the former whereby the size of the diaphragm aperture varies directly as the change in distance of the object and in accordance with the luminosity of said illuminating means, and means for altering said inter-connecting means, in accordance with different emulsion speeds of film used in the camera.

11. In a photographic camera of the type described, the combination of a portable support, an illuminating means on said support, means for attaching a focusing camera including an adjustable diaphragm to said support substantially in the plane of said illuminating means, said camera including a focusing member, and a diaphragm adjusting ring, a linkage for inter-connecting said focusing member and said diaphragm adjusting ring, whereby the latter is adapted to be adjusted simultaneously by an adjustment of the former whereby the size of the diaphragm aperture varies directly as the change in distance of the object and in accordance with the luminosity of said illuminating means, means for altering said linkage whereby the adjustment of the diaphragm relative to the adjustment of the focusing can be varied in accordance with a variation in the emulsion speeds of different films used in the camera, said means including an index member adapted to cooperate with a film speed scale on the diaphragm adjusting ring, said index member constituting a member of said linkage and frictionally connected to the diaphragm adjusting ring to be capable of movement relative thereto.

12. In a photographic apparatus of the type described, the combination of a portable support, an illuminating means carried by said support, and including means for varying the luminosity of the same, means for attaching a focusing camera including an adjustable diaphragm to said support substantially in the plane of said illuminating means, said camera including a focusing ring, a diaphragm adjusting ring provided with a scale calibrated in film speeds, and an index ring for cooperating with said film speed scale rotatable relative to said diaphragm adjusting ring but frictionally engaging the same whereby they normally move in unison, an alterable linkage positively inter-connecting said focusing ring and said index member, whereby the latter is adapted to be adjusted simultaneously by an adjustment of the former whereby the size of the diaphragm aperture varies directly as the change in distance of the object and in accordance with the luminosity of said illuminating means, said linkage including a shaft rotatably mounted on the support, an arm fixed to said shaft and provided with a plurality of spaced apertures, a second arm journalled on said shaft adjacent said first mentioned arm, a retractable pin on said second arm adapted to enter one of said apertures in the other arm to positively connect said arms together in a given relationship, a link connecting one arm with the focusing ring, a second link connecting the other arm with the index ring, means for rotating said shaft, and a pointer fixed to said shaft and cooperating with a focusing scale on the support.

13. A device of the type described for use in combination with a photographic focusing camera having an adjustable diaphragm, a focusing ring, and a diaphragm adjusting ring, said device comprising a portable support, an illuminating means on said support, means for attaching the camera to said support substantially in the plane of said illuminating means, a linkage carried by said support and adapted to inter-connect focusing ring and diaphragm adjusting ring when the camera is fixed on the support, whereby the diaphragm adjusting ring is adapted to be adjusted simultaneously by an adjustment of the focusing ring whereby the size of the diaphragm aperture varies directly as the change in distance of the object and in accordance with the luminosity of said illuminating means.

14. A device of the type described for use in combination with a photographic focusing camera having an adjustable diaphragm, a focusing ring, and a diaphragm adjusting ring, said device comprising a portable support, an illuminating means on said support, means for attaching the camera to said support substantially in the plane of said illuminating means, a linkage carried by said support and adapted to inter-connect said focusing ring and diaphragm adjusting ring when the camera is fixed on the support, whereby the diaphragm adjusting ring is adapted to be adjusted simultaneously by an adjustment of the focusing ring whereby the size of the diaphragm aperture varies directly as the change in distance of the object and in accordance with the luminosity of said illuminating means, to keep the exposure constant upon a change in the focus, said linkage including a double-ended lever rotatably mounted on said support, a link connected to one end of said lever and adapted to be connected to said focusing ring, and a second link connected to the other end of said lever adapted to be connected to said diaphragm adjusting ring.

15. A device of the type described for use in combination with a photographic focusing camera having an adjustable diaphragm, a focusing ring, and a diaphragm adjusting ring, said device comprising a portable support, means for attaching the camera to said support substantially in the plane of said illuminating means, an illuminating means carried by said support, means for varying the luminosity of the same, an alterable linkage movably mounted on said support for inter-connecting said diaphragm adjusting ring and said focusing ring whereby the former is adapted to be adjusted simultaneously by an adjustment of the latter whereby the size of the diaphragm aperture varies directly as the change in distance of the object and in accordance with the luminosity of said illuminating means, said linkage including a shaft rotatable on the support, an arm fixed to said shaft and provided with a plurality of spaced apertures, a second arm journaled on said shaft adjacent said first mentioned arm, a retractable pin carried by said second arm and adapted to engage one of said apertures to positively connect said arms together, a link connected to one of said arms and adapted to be connected to the focusing ring of the camera positioned on the support, a second link connected to the second arm and adapted to be connected to the diaphragm adjusting ring of the camera, an operating member connected to said shaft for rotating the same, and a pointer fixed to said shaft and adapted to cooperate with a focusing scale on the support, for indicating the focusing adjustment of the camera effected through movement of said linkage.

PHILIPP PAUL BERNHARD STRAUSS.